(12) United States Patent
Ebrahimi Afrouzi

(10) Patent No.: US 11,119,216 B1
(45) Date of Patent: Sep. 14, 2021

(54) EFFICIENT COVERAGE PLANNING OF MOBILE ROBOTIC DEVICES

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

(*) Notice: Subject to any disclaimer, the term of this patent is extended or adjusted under 35 U.S.C. 154(b) by 363 days.

(21) Appl. No.: 16/179,861

(22) Filed: Nov. 2, 2018

Related U.S. Application Data

(60) Provisional application No. 62/580,625, filed on Nov. 2, 2017.

(51) Int. Cl.
| | |
|---|---|
| *G01S 17/89* | (2020.01) |
| *G05D 1/00* | (2006.01) |
| *G05D 1/02* | (2020.01) |
| *G06K 9/00* | (2006.01) |
| *G06T 7/593* | (2017.01) |
| *G06K 9/20* | (2006.01) |
| *G01S 7/48* | (2006.01) |

(52) U.S. Cl.
CPC ............ *G01S 17/89* (2013.01); *G01S 7/4804* (2013.01); *G05D 1/0088* (2013.01); *G05D 1/024* (2013.01); *G05D 1/027* (2013.01); *G05D 1/0214* (2013.01); *G06K 9/00664* (2013.01); *G06K 9/00805* (2013.01); *G06K 9/20* (2013.01); *G06T 7/593* (2017.01); *G05D 2201/0215* (2013.01); *G06K 2009/2045* (2013.01); *G06T 2207/10028* (2013.01)

(58) Field of Classification Search
CPC ............ G05S 17/89; G05D 1/027; G05D 1/00
See application file for complete search history.

(56) References Cited

U.S. PATENT DOCUMENTS

| | | | |
|---|---|---|---|
| 5,995,884 A * | 11/1999 | Allen | G05D 1/0225 701/24 |
| 8,355,818 B2 | 1/2013 | Nielsen et al. | |
| 9,031,779 B2 | 5/2015 | Djugash | |
| 10,045,675 B2 * | 8/2018 | Haegermarck | A47L 9/0488 |
| 10,613,541 B1 * | 4/2020 | Ebrahimi Afrouzi | G05D 1/0219 |
| 2004/0117079 A1 * | 6/2004 | Hulden | G05D 1/0219 701/23 |
| 2007/0213892 A1 * | 9/2007 | Jones | G05D 1/0227 701/23 |
| 2008/0009965 A1 * | 1/2008 | Bruemmer | G06N 3/008 700/245 |

(Continued)

FOREIGN PATENT DOCUMENTS

| | | | |
|---|---|---|---|
| DE | 102013104578 B3 | 4/2014 | |
| JP | 11126593 A | 5/1993 | |
| JP | WO-2010004744 A1 | 12/2011 | |

*Primary Examiner* — Kira Nguyen

(57) ABSTRACT

Provided is a robot-implemented process to create a coverage plan for a work environment, including obtaining, with a robotic device, raw data values of a work environment pertaining to likelihood of operational success and presence or absence of operational hazards contained within the work environment; determining, with one or more processors, the most efficient coverage plan for the robotic device based on the raw data values; and enacting the coverage plan based on the values from the data.

20 Claims, 7 Drawing Sheets

(56) References Cited

U.S. PATENT DOCUMENTS

| | | | |
|---|---|---|---|
| 2011/0167574 A1* | 7/2011 | Stout | G05D 1/0219 15/3 |
| 2011/0202175 A1* | 8/2011 | Romanov | B25J 5/00 700/250 |
| 2013/0131910 A1* | 5/2013 | Takahashi | G05D 1/0212 701/27 |
| 2017/0344007 A1* | 11/2017 | Song | G05D 1/0274 |
| 2019/0207979 A1* | 7/2019 | Dhanabalan | H04L 67/42 |
| 2019/0213438 A1* | 7/2019 | Jones | G06K 9/00362 |

* cited by examiner

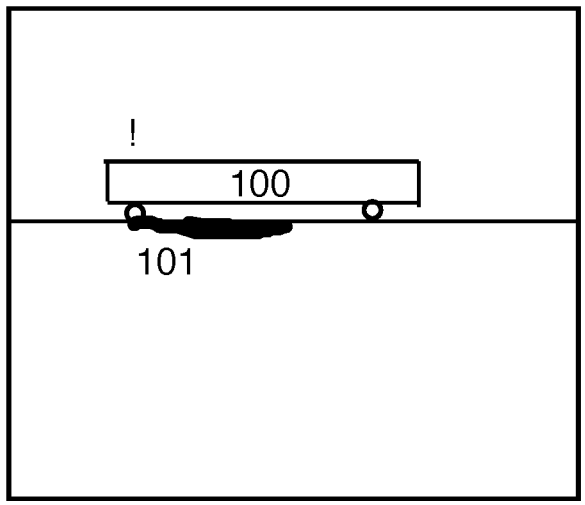
FIG. 1A
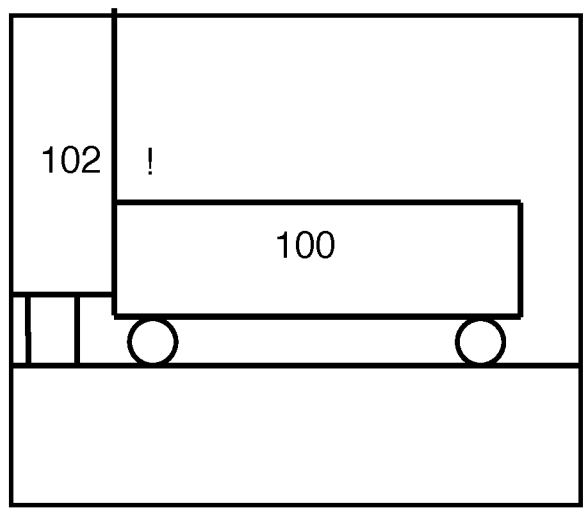
FIG. 1B
FIG. 1C
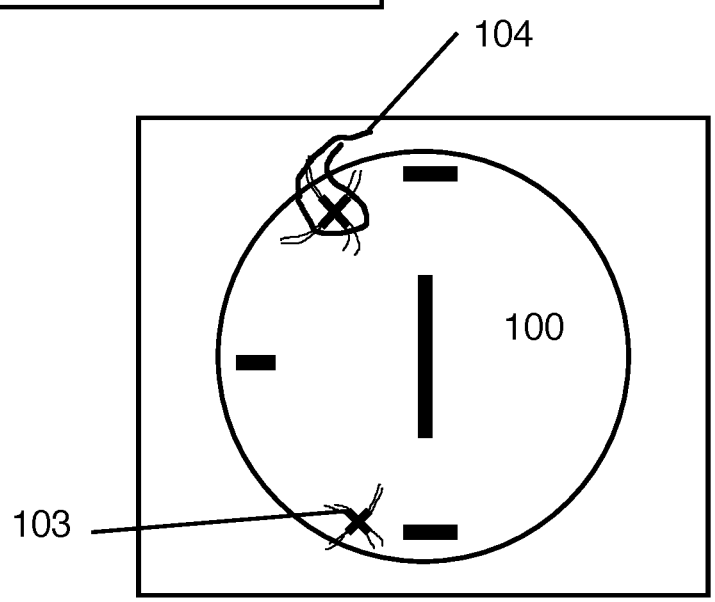

EFFICIENT COVERAGE PLANNING OF MOBILE ROBOTIC DEVICES

CROSS-REFERENCE TO RELATED APPLICATIONS

This application claims the benefit of Provisional Patent Application No. 62/580,625 which is hereby incorporated by reference. In this application, certain U.S. patents, U.S. patent applications, or other materials (e.g., articles) have been incorporated by reference. Specifically, in addition to the preceding, U.S. patent application Ser. Nos. 16/048,179 & 16/048,185 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF INVENTION

The present disclosure relates to methods for improving the efficiency of robotic device, and more particularly, to directing the functions of a robotic device based on identifying locations with operational hazards.

BACKGROUND OF INVENTION

Autonomous or semi-autonomous robotic devices are increasingly used within consumer homes and commercial establishments. In several instances, robotic devices are desirable for the convenience they provide to a user. For example, mobile robotic devices may be used for cleaning purposes to provide a convenience to users to eliminate weekly chores. These chores may include sweeping, mopping, dusting, mowing a lawn, and the like. These chores may be inconvenient and unsatisfying for a user to complete, as they are tedious, unsanitary, and time consuming for a user to partake in. While the functions performed by robotic devices are highly desirable, much remains to be desired in the efficiency with which robotic devices perform their work functions. For example, if one portion of a work surface is more likely than another to have operational hazards present, it is preferable that a robotic device avoid the hazards. Further, it is preferable that robotic devices identify hazards and issues in a work environment and operate according to the locations in which these hazards and issues are located.

None of the preceding discussion should be taken as a disclaimer of any of the described techniques, as the present approach may be used in combination with these other techniques in some embodiments.

SUMMARY

The following presents a simplified summary of some embodiments of the present techniques. This summary is not an extensive overview of the invention. It is not intended to limit the invention to embodiments having any described elements or to delineate the scope of the invention. Its sole purpose is to present some embodiments of the invention in a simplified form as a prelude to the more detailed description that is presented below.

Some aspects include a process including: obtaining, with a robotic device, raw values pertaining to likelihood of encountering operational hazards in a work environment by sensors positioned on the robotic device, generating, with one or more processors, a map of the work environment based on data obtained from sensors of the robotic device, generating, with one or more processors of the robotic device, a coverage plan for each section of the work area, the coverage plan prioritizing the robotic device performing work functions in work areas that have the highest probability of being successfully completed over work areas with a lesser likelihood of being successfully completed; and, the robotic device performing the coverage plan.

Some aspects include a method, including providing a robotic device, the robotic device operating in a first portion of a work area the robotic device traversing the work area in a first pattern, wherein: at least part of the first pattern is determined by one or more processors of the robotic device based on an aggregate map generated from prior work sessions utilizing an objective function that assigns values to portions of the map to at least one of the following: likelihood of operational success, likelihood of operational failure, likelihood of encountering an operational hazard; and the robotic device operating in a second portion of the work area by traversing the work area in a second pattern.

BRIEF DESCRIPTION OF DRAWINGS

The present techniques are described with reference to the following figures:

FIG. 1A illustrates an example of a robotic device encountering an operational hazard.

FIG. 1B illustrates an example of a robotic device encountering an operational hazard.

FIG. 1C illustrates an example of a robotic device encountering an operational hazard.

DETAILED DESCRIPTION OF THE INVENTIONS

Figure 2A:
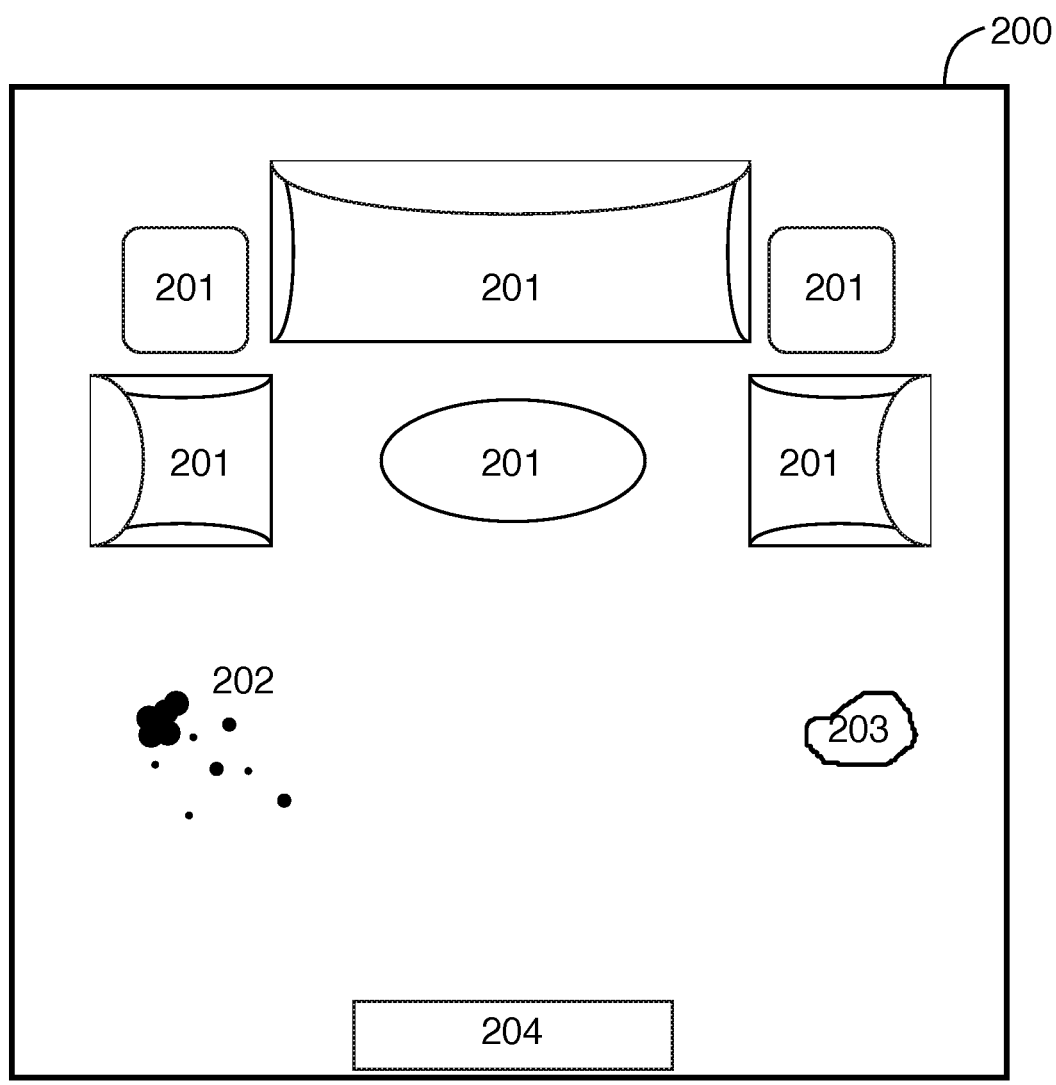
FIG. 2A illustrates an example of a work environment.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions, or subsets thereof, may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Various embodiments are described herein below, including methods and systems. It should be kept in mind that the invention might also cover articles of manufacture that include a computer-readable medium on which computer-readable instructions for carrying out various embodiments of the inventive techniques are stored. The computer-readable medium may include semi-conductor, magnetic, opto-magnetic, optical, or other forms of computer-readable medium for storing computer-readable code. Further, embodiments may also include apparatuses for practicing embodiments of the invention. Such apparatus may include circuits, dedicated and/or programmable, to carry out tasks pertaining to embodiments described herein.

In some embodiments, "robot" or "robotic device" may include one or more autonomous or semi-autonomous devices having communication, an actuator, mobility, and/or processing elements. Such robots or robotic devices may, but are not required to (which is not to suggest that any other described feature is required in all embodiments), include a casing or shell, a chassis, a transport drive system such as wheels or other mobility device, a motor to drive the wheels or other mobility device, a receiver that acquires signals transmitted from, for example, a transmitting beacon, a processor and/or controller that processes and/or controls motors, methods, and operations, network or wireless communications, power management, etc., and one or more clock or synchronizing devices. Robots or robotic devices may also include a power module for delivering (and in some cases storing) electrical power, a sensor module for observing the environment and for sending commands based on the observed environment, and a control module for storage of operation modes, command responses to the observed environment or user input, and the like. The sensor module may include sensors for detecting obstacles, types of flooring, cliffs, system status, temperature, and the like or sensors for measuring movement. An interface module may also be included to provide an interface between the robot and the user. The robot or robotic device may further include IR sensors, tactile sensors, sonar sensors, gyroscopes, ultrasonic range finder sensors, depth sensing cameras, odometer sensors, optical flow sensors, LIDAR, cameras, IR illuminator, remote controls, Wi-Fi capability, network card, Bluetooth capability, cellular functionality, USB ports and RF transmitter/receiver. Other types of robots or robotic devices with other configurations may also be used.

In embodiments, a control system of the robotic device may be utilized. The control system may include, but is not limited to, a system or device(s) that perform, for example, methods for receiving and storing data; methods for processing data; methods for processing command responses to stored or processed data, to the observed environment, to internal observation, or to user input; methods for detecting operational hazards in the work environment; methods for detecting debris in the work environment; and methods for navigation and other operation modes. For example, the control system may receive data from an obstacle sensor, and based on the data received, the control system may respond by commanding the robotic device to move in a specific direction. As a further example, the control system may receive image data of the observed environment, process the data, and use it to create a map of the environment. The control system may be a part of the robotic device, the camera, a navigation system, a mapping module or any other device or module. The control system may also comprise a separate component coupled to the robotic device, the navigation system, the mapping module, the camera, or other devices working in conjunction with the robotic device. More than one control system may be used.

As understood herein, the term "operational hazard" or "hazard" may be defined generally to include unwanted matter which may pose as an issue for a robotic device when traversing in a work environment, including but not limited to, cords, cables and wires wherein they act as a hazard for a robotic device such as, for example, becoming entangled with a robotic device. Additionally, operational hazards may include obstacles of which a robotic device may bump into and become damaged by, or which may interfere with a robotic device's ability to operate successfully. Operational hazards may also include dynamic obstacles which are obstacles encountered in which a robotic device did not expect to encounter, such as, for example, a moving obstacle such as a human, pet, other device or the like, an obstacle which was not previously present in the location but is now present in, and the like. Further, substances on a work surface, which may, for example, damage a robotic device or render a robotic device inoperable if a robotic device navigates over the substance are also operational hazards. Items on a floor of which a robotic device cannot overcome by driving over the obstacle, or obstacles of a type which interfere with a robotic device when conduction work operations may also be operational hazards. Work surface transitions such as between two different work surface types may also pose as an operational hazard as the robotic device may become stuck and inoperable when attempting to navigate on the transition between the two work surface types. An operational hazard may also include locations in which a robotic device becomes stuck, such as a robotic device becoming stuck under an item such as a piece of furniture or the like.

As understood herein, the term "work cycle", "work session", "operational session" or "operational cycle" may be defined generally as a work time of a robotic device from start to finish, whether ended by completion of work of an area, by instruction or programmed setting, or by the depletion of a battery powering the robotic device.

The present invention proposes embodiments of an autonomous mobile robotic device that may perform work functions in an environment wherein the one or more processors of the robotic device generate a coverage plan of the work environment with the highest likelihood of being successfully completed. Various decision making factors may be utilized by the one or more processors of the robotic device when generating the coverage plan such as the presence or absence of operational hazards in a work environment. The robotic device may comprise, but is not limited to, a set of wheels, a power source, a chassis, a suspension system, a rechargeable battery, a control module, a processor, and the like. In some embodiments, the robotic device may further comprise a mapping module for mapping the environment using mapping techniques such as SLAM, and mapping tools such as imaging devises, sonar devices, LIDAR and LADAR devices, structured light devices, stereo vision and the like. In some embodiments, the robotic device may further comprise a localization module. Cameras, LIDAR, LADAR, stereo imaging, signal detectors and receivers, gyroscope, optical encoder, optical flow sensor, depth sensors and other devices may be used to capture information that the processor of the robotic device may use to localize itself within an internal map of the working environment. In some embodiments, the processor of the robotic device may use machine learning techniques to learn the most optimal route for navigating through a working environment from, for example, a storage location of the robotic device to a working location of the environment and back to its storage location. In some embodiments, the processor of the robotic device may use machine learning techniques to learn the most optimal route for navigating through a working environment from, for example, a first location of the working environment, to a second location of the working environment, to a third location of the working environment, and so forth. Various observations may be collected during operation in order to determine the most optimal path for the robotic device when navigating through the work environment. For example, observations such as number of collisions, travel time, number of stalls, and travel distance may be used in determining the most optimal path. In some embodiments, the robotic device may have a wireless module to wirelessly send and receive information, such as a Wi-Fi module, a Bluetooth module, a RF module and the like. In some embodiments, the robotic device may comprise a scheduling module for, for example, setting a schedule for a working session. This may include the day, time, frequency, duration of the working session, and the like.

In some embodiments, one or more processors of a robotic device may generate a coverage plan of the work environment for operations of the robotic device which factors in the likelihood of success in conducting work operations and navigations without encountering issues. For example, a coverage plan may factor in data pertaining to the number of hazards expected to be encountered in areas of the work environment. In embodiments, a robotic device when operating in a work environment, may prioritize operating in a center of a work area before navigating and operating along the perimeter of a work area. For example, a mobile robotic cleaning device may operate by cleaning and navigating in a center of a room, before conducting navigation and operations along the perimeter of the room. In embodiments, one or more processors of a robotic device may predict that a robotic device is more likely to be successful in conducting work operations in a center of a work area than along a perimeter of a work area and as such command a robotic device to navigate and operate in a center of a work area before navigating and operating along a perimeter of a work area. In embodiments, during a working session, a robotic device may encounter areas in the work environment which contain operational hazards. In embodiments, when a robotic device encounters an operational hazard in the work environment, data pertaining to the operational hazard may be compiled by one or more processors of a robotic device and stored in a memory of the robotic device to be utilized for future use. In embodiments, for example, data pertaining to the location, date and time that the operational hazard was encountered may be compiled for future use. In embodiments, for example, data pertaining to the type of operational hazard encountered, such as, for example, cables on a work surface and the like may be compiled by, for example, a robotic device such as, for example, a robotic vacuum. For example, if a robotic vacuum encounters a cable, and the cable becomes entangled around a brush of the robotic vacuum rendering the robotic vacuum inoperable, this data will be compiled for future use. In another example, if a robotic device encounters an operational hazard such as, for example, a liquid on a work surface of which a robotic device can not clean away, or which poses a danger to a robotic device, data pertaining to this encounter may be compiled. In additional embodiments, if a robotic device encounters an obstacle such as, for example, a robotic device bumping into an obstacle, data pertaining to this encounter may be compiled. In embodiments, one or more processors of a robotic device may expect that a perimeter of a work area is more likely to present issues for a robotic device to complete operations than a center of a work area. The one or more processors may expect to encounter issues along the perimeter of a work area due to previous work session in the same work area indicating as such. Alternatively, the one or more processors of a robotic device may by default expect a perimeter of a work area to contain issues. In embodiments, a robotic device may operate in a center of a work area prior to testing the perimeter of a work area to determine whether or not operating along the perimeter of the work area presents issues for the robotic device such as by encountering an operational hazard. In alternative embodiments, a robotic device may operate along the perimeter of a work area prior to operating in the center of a work area.

In some embodiments, a memory of the robotic device may contain an internal database of operational hazards likely to be encountered within the working environment. In embodiments, an operational hazard encountered in the work environment may be identified using various sensors to capture features of the operational hazard and the processor of the robotic device may compare the features captured of the operational hazard with features stored in an internal database of types of operational hazards that may be encountered in order to determine the type of operational hazard the robotic device has encountered. The processor of the robotic device may note the increased likelihood of that type of operation hazard being located in the region of the environment in which it was encountered. For example, if a robotic device encounters a cable on the work surface, image sensors of the robotic device may capture features of the cable and the processor may determine it is a cable based on an internal database of operational hazards and their features. The processor of the robotic device may mark the region in which the cable was encountered within an internal map as a region with increased likelihood of containing a cable. In some embodiments, the processor may further determine if the type of operational hazard encountered may be overcome by the robotic device. For example, the processor may determine if the operational hazard encountered is, for example, a liquid, but the robotic device is, for example, a vacuum, that the operational hazard poses a danger to the robotic device and that the robotic device should therefore avoid the liquid. In FIG. 1A robotic device 100 has driven over operational hazard 101 which in this example is a liquid and has become inoperable due to driving over the liquid. In embodiments, if the robotic device encounters and identifies a type of operational hazard, a robotic device may alert a user or another robotic device which has the capabilities of dealing with the hazard. In embodiments, regions wherein the same operational hazard are consistently encountered may be classified by a processor of the robotic device as a high operational hazard area and may be marked in a map of the environment as such. In embodiments, the processor of the robotic device may attempt to alter its path in order to avoid high operational hazard areas. In embodiments, regions wherein operational hazards are consistently encountered may be classified by a processor of the robotic device as a high operational hazard area and may be marked in a map of the environment as such. In embodiments, the processor of the robotic device may attempt to alter its path in order to avoid areas with a high likelihood of containing operational hazards. In FIG. 1B, robotic device 100 has encountered obstacle 102 by bumping into it during a driving session. Obstacles of which a robotic device bump into may be classified as an operational hazard as the obstacles may cause damage to the robotic device if the robotic device drives into the obstacle or may prevent the robotic device from successfully operating in the area. In FIG. 1C robotic device 100 has become inoperable due to becoming entangled with operational hazard 104 which is a cord which has wrapped around a side brush 103 of robotic device 100. In some embodiments, dynamic obstacles may be classified as an operational hazard. Dynamic obstacles include obstacles of which a robotic device does not expect to encounter, such as, for example, moving objects including, but not limited to, pets, humans, other robotic devices, and the like. Dynamic obstacles may also be new obstacles that are now present in a location in which an obstacle was not previously present. In embodiments, if a robotic device encounters a dynamic obstacle in repeated circumstances in a same location, the obstacle may be reclassified as a permanent obstacle and the one or more processors of the robotic device may expect to encounter the obstacle in that location in the future. In some embodiments, transitions between different work surface types may pose an operational hazard, for example, a transition from a hardwood surface to a thick pile carpet may pose an operational hazard as it may cause a robotic device to become unstable as it attempts to overcome the transition. In some embodiments, preferences may be set, and the set of preferences may determine what poses as an operational hazard. For example, a preference may be set that a robotic device only operate on a hard floor surface; if a robotic device encounters a carpeted surface during operation, based on the preferences set the transition to carpet may be identified as an operational hazard. In embodiments, an operational hazard may be identified by the one or more processors of the robotic device by a robotic device becoming stuck. For example, if a robotic device is unable to overcome a transition between two work surface types and becomes stuck in that location, the transition may be identified by the one or more processors of the robotic device as an operation hazard. As another example, a robotic device may navigate under, for example, a piece of furniture, or large obstacle, and become stuck, unable to navigate away from the issue, and the one or more processors of the robotic device may thus identify the location in which this occurred as a location with an operational hazard of which the robotic device should avoid.

In embodiments, the robotic device may compile and catalogue all the data regarding operational hazards that have been detected or encountered in the work environment. In embodiments, regions where operational hazards have been detected or encountered by the robotic device, or have been detected or encountered by another robotic device, or in regions which have been classified as having a high likelihood of containing an operational hazard, the one or more processors of a robotic device may give a lower priority to when creating a coverage plan of the work environment. In embodiments, in order to provide the most efficient coverage plan possible, a robotic device may prioritize working in areas with a low likelihood of containing operational hazards over areas with a high likelihood of containing operational hazards, the coverage plan focusing on the areas in which the robotic device is most likely to successfully complete operations. In embodiments, for example, if in a bedroom area, cables are routinely strewn about a room and encountered by a robotic device, while in a sitting room there is routinely a low level of operational hazards, one or more processors of a robotic device when planning coverage plan may prioritize operating in the sitting room area first before operating in the bedroom. As an additional example, if operational hazards are routinely encountered along the perimeter of work areas but are less encountered in the center of work areas, one or more processors of a robotic device may create a coverage plan prioritizing operations in the center of work areas prior to operations along the perimeter of work areas. Maximum efficiency is maintained in this manner because the areas with the highest likelihood of successful operations will be prioritized over areas with a lower likelihood of operational success. Further, in embodiments, a scheduling module may be utilized for setting schedules for the operations of a robotic device. For example, a schedule may be set for a robotic device to clean an entire house over the course of a week with the robotic device operating daily, but only supplying the robotic device with the ability to operate for, for example, two hours each day. In such an example, a robotic device may prioritize cleaning functions for areas with a high likelihood of operational success before cleaning areas which have a low likelihood of operational success. In embodiments, the robotic device may keep track of which area it has operated in during each work session. In embodiments a robotic device may keep track of locations within each work area in order to create a coverage plan. In embodiments, for example, a robotic device may prioritize areas in a room that have a lower likelihood of containing operational hazards such as a center of a room than areas in the same room that have a higher likelihood of containing an operational hazard such as a perimeter of a room, and thereby perform functions and a navigational route as such. In some embodiments, one or more processor of a robotic device may alter the functions of the robotic device based on the presence or absence of operational hazards, or likelihood of an operational hazard being present in a work area or by detecting a low or high likelihood of success of work operations. In embodiments, for example, a robotic device may operate at a faster rate of traveling speed in areas where operational hazards are not present or where there is a low likelihood of operational hazards being present, or where there is a high likelihood of operational success. In embodiments, for example, a robotic device may operate at a slower rate of traveling speed in areas where operational hazards are present or there is a lower chance of operational success.

In some embodiments, a memory of the robotic device may contain an internal database of obstacles likely to be encountered within the working environment. In embodiments, an obstacle encountered in the work environment may be identified using various sensors to capture features of the obstacle and the processor to determine the type of obstacle based on the internal database. The processor of the robotic device may note the increased likelihood of that type of obstacle being located in the region of the environment in which it was encountered. For example, if a robotic device encounters a child's toy on the ground, image sensors of the robotic device may capture features of the child's toy and the processor may determine it is a child's toy based on an internal database of obstacles and their features. The processor of the robotic device may mark the region in which the child's toy was encountered within an internal map as a region with increased likelihood of containing a child's toy. In some embodiments, the processor may further determine if an obstacle may be overcome by the robotic device. For example, the processor may determine if the obstacle is of a type that may be overcome by the robotic device driving over the obstacle by attempting to do so. In embodiments, for example, if a robotic device encounters an obstacle on the work surface, and that obstacle is a cord, the robotic device may attempt to determine whether or not it can overcome such an obstacle by attempting to drive over it. In embodiments, for example, if the robotic device fails to overcome the obstacle such as, for example, a cord, then the robotic device may determine that it should avoid cords. In embodiments, for example, if the robotic device is successful in overcoming the obstacle, such as, for example, a cord, then the robotic device may determine that it may attempt to overcome similar obstacles in the future. In embodiments, if the robotic device encounters an obstacle with which interferes with the robotic device's functionality, or which disables the robotic device, such as, for example, if a cord in the environment becomes entangled with a brush of the robotic device, the robotic device may catalogue the encounter and avoid such obstacles in the future. In embodiments, if a robotic device encounters a large obstacle, such as, for example, a table or chair, the processor may determine that it cannot overcome the obstacle and may attempt to maneuver around the obstacle. In some embodiments, regions wherein obstacles are consistently encountered may be classified by the processor of the robotic device as a high traffic area. In embodiments, an area of a work environment classified as a high traffic area may be marked as such in an internal map of the environment. In some embodiments, the processor of the robotic device may attempt to alter its path in order to avoid high traffic areas. In some embodiments, the date, time, location, and type of obstacle encountered may be catalogued for use in future working sessions. In embodiments, for example, where obstacles are encountered frequently at a similar time, a robotic device may plan a working session for such an area when obstacles are encountered less frequently, and may prioritize operations in other locations at the time when that area tends to have a high frequency of obstacles.

In some embodiments, a memory of the robotic device may contain an internal database of debris likely to be encountered within the working environment. In embodiments, a debris encountered in the work environment may be identified using various sensors to capture features of the debris and the processor of the robotic device may compare the features captured of the debris with features stored in an internal database of types of debris that may be encountered in order to determine the type of debris the robotic device has encountered. The processor of the robotic device may note the increased likelihood of that type of debris being located in the region of the environment in which it was encountered. For example, if a robotic device encounters a pile of dog hair on the work surface, image sensors of the robotic device may capture features of the dog hair and the processor may determine it is a pile of dog hair based on an internal database of debris and their features. The processor of the robotic device may mark the region in which the dog hair was encountered within an internal map as a region with increased likelihood of containing dog hair. In some embodiments, the processor may further determine if the type of debris encountered may be cleaned by a cleaning function of the robotic device. For example, the processor may determine if the debris encountered is, for example, a liquid, but the robotic device is, for example, a vacuum, that the robotic device does not have the capabilities of cleaning the debris. In embodiments, if the robotic device encounters and identifies a type of debris with which the robotic device is incapable of cleaning, the robotic device may communicate with, for example, a control system or another robotic device which has the capabilities of cleaning the debris, in order to have the debris cleaned from the environment. In embodiments, if the robotic device encounters a type of debris of which the robotic device is unable to clean, and the debris is of a type that poses a risk of damage to the robotic device, the one or more processors of the robotic device may classify the debris encountered and location encountered as containing an operational hazard. In embodiments, regions wherein the same debris are consistently encountered may be classified by the one or more processors of the robotic device as a high debris area and may be marked in a map of the environment as such. In embodiments, the processor of the robotic device may attempt to alter its path in order to prioritize high debris areas. In embodiments, regions wherein debris is consistently encountered may be classified by the processor of the robotic device as a high debris area and may be marked in a map of the environment as such. In embodiments, the processor of the robotic device may attempt to alter its path in order to prioritize high debris areas.

In embodiments, the robotic device may compile and catalogue all the data regarding debris that is detected in the work environment. In embodiments, regions where debris has been detected by the robotic device, or has been detected by another robotic device which is unable to clean said debris, or in regions which have been classified as a high debris area, a robotic device may prioritize when planning a cleaning session and navigational route. In embodiments, in order to provide the most efficient cleaning possible, a robotic device may prioritize cleaning in areas with a high likelihood of containing debris over areas with a low likelihood of containing debris in order to clean in the most efficient manner possible by focusing on the areas most likely to have debris. In embodiments, for example, if in a kitchen area, food particles are routinely encountered by a robotic device, while in a sitting room there is routinely a low level of debris, one or more processors of a robotic device when creating a coverage plan may prioritize operating in the kitchen area first before operating in the sitting room area. Maximum efficiency is maintained in this manner because the areas with the highest likelihood of successfully cleaning debris will be prioritized over those with a lower likelihood of successfully cleaning debris. For example, if the kitchen area routinely has food particles on the work surface, but the sitting room does not, then it is more important that the kitchen area be cleaned in order to avoid pests such as rodents or insects, while in comparison the sitting area may only have dust collected on the floor which while undesirable, may not be as important as avoiding pests. In embodiments, for example, a schedule may be set for a robotic device to clean an entire house over the course of a week with the robotic device operating daily, but only supplying the robotic device with the ability to operate for, for example, two hours each day. In such an example, a robotic device may prioritize cleaning functions for areas with a high likelihood of recurring debris on a daily basis, such as, for example, the kitchen, living rooms, or bedrooms, before cleaning other rooms. Furthering the example, the robotic device may focus on cleaning the kitchen, living room, or bedrooms, every day, while cleaning other rooms such as a sitting room, family room, bathroom or the like, once a week. In embodiments, the robotic device may keep track of which room it has cleaned during each cleaning session. In embodiments one or more processors of a robotic device may keep track of locations within each work area in order to create a coverage plan. In some embodiments, a robotic device may alter the functions of the robotic device based on the presence or absence of debris, likelihood of debris being present in a work area, or chance of successfully completing operations. In embodiments, for example, a robotic device may operate at a faster rate of traveling speed in areas where debris is not present or where there is a low likelihood of debris being present. In embodiments, for example, a robotic device may operate at a slower rate of traveling speed in areas where debris is present or where there is a higher likelihood of debris being present in order to more carefully clean the area. In embodiments, for example, a robotic device may operate utilizing, for example, a higher rate of suction, or a higher rate of brush rpm, or a higher rate of speed of a grass cutting rotor blade, in areas where there is a higher likelihood of debris being present. In embodiments, for example, a robotic device may operate utilizing, for example, a lower rate of suction, or a lower rate of brush rpm, or a lower rate of speed of a grass cutting rotor blade in areas where there is a lower likelihood of debris being present.

In embodiments, utilizing a mapping module, a robotic device may generate a map of the working environment as the robotic device navigates through the work environment. In embodiments, with each working session, the robotic device may generate a map of the work environment. In embodiments, with each successive working session, the map generated during that session may be compiled with maps generated from prior work cycles. In embodiments, the compiled maps may generate a comprehensive map of all the maps previously generated. An example of a method for mapping a floor plan is described in U.S. patent application Ser. Nos. 16/048,179 & 16/048,185, the entirety of which are hereby incorporated by reference. In embodiments, the comprehensive map may contain data suggestive of trends in the work environment. In embodiments, for example, trends regarding operational hazards such as the type of hazard encountered, location of hazard encountered, how often a hazard or hazards are encountered, the date and or time a hazard was encountered and the like data may be utilized for creating a coverage plan. In embodiments, trends regarding likelihood of successfully completing operations such as locations with a high likelihood of completing successful operations, how often operations are successfully completed, date and time operations are successfully completed and the like data may be utilized for creating a coverage plan. In embodiments, the map of the work area may utilize a grid system, in which the work area is divided into a grid of cells. In embodiments, as the robotic device navigates through the work area, or operates during a working session, data captured through sensors of the robotic device may be recorded in each portion or cell of the map.

In embodiments, data obtained by a control system or another robotic device may be recorded for each portion or cell of the map. In some embodiments, the values represented for each portion or cell of a map may be representative of likelihood of successfully completing operations for that portion or cell of the map. In some embodiments, the data may simply reflect a value regarding the presence or absence of operational hazards for that portion or cell in the map. In some embodiments data pertaining to the type of operational hazard, number of operational hazards, size of operational hazards, and the like, may be represented for each portion or cell in the map. In embodiments, with each working session, a robotic device may have recorded a value for each cell in the map pertaining to data representative of likelihood of successful operations or presence or absence of operational hazards. In embodiments, a map containing all of the values for each portion or cell operated in may be generated by the robotic device. In embodiments, during each working session the one or more processors of the robotic device may generate a new map with a new set of values for each portion or cell. In embodiments, after each working session the map generated may be compiled into an aggregate compiled map which is condensed from all prior maps generated during prior working sessions. In embodiments, the aggregate map generated may represent each portion or cell as an average of the values for that cell from all compiled past working cycles. In embodiments, the aggregate map generated is updated after each new cycle. In embodiments, the cells of the map may represent may be updated with regards to multiple types of data. In embodiments, for example, each portion or cell of the map may contain data representative of various information pertaining to, for example, likelihood of successfully completing operations, presence or absence of operational hazards, debris, obstacles, work surface types, and the like.

In embodiments, once an aggregate map is generated, a robotic device may be controlled or directed to navigate or operate in locations in a work area based on the values of the portions or cells in the aggregate map. In embodiments, various coverage plans based on the aggregate map generated may be envisioned. In embodiments, a robotic device may be controlled to navigate and operate based on historical data, such as, for example, by prioritizing operation in areas where a high likelihood of operational success or areas containing a low likelihood of operational hazards. In embodiments, a robotic device may be controlled or directed to navigate or operate based on historical data regarding the presence or absence of obstacles in a work area. In embodiments, a robotic device may be controlled or directed to navigate or operate in areas based on preferences set in prior working sessions. In embodiments, a robotic device may be controlled or directed to navigate or operate in areas based on work surface type, such as, for example, a robotic device being controlled to operate at a higher rate of navigation speed on hard work surface types such as tile. In embodiments, a robotic device may be controlled or directed to navigate or operate in rooms or areas with a historically higher likelihood of operational success of the aggregate portions or cells of that room or area over rooms or areas with a historically lower likelihood of operation success of the aggregate portions or cells of that room or area. In embodiments, a robotic device may be controlled or directed to navigate or operate in rooms or areas with a historically lower set of operational hazard values of the aggregate portions or cells of that room or area over other rooms or areas with a historically higher set of operational hazard values of the aggregate portions or cells of the map for that room or area. In embodiments, a robotic device may be controlled or directed to navigate or operate in a portion of a work area rather than to operate in an entire work area. For example, a robotic device may be controlled to operate on first section of a hallway over a second section of a hallway. In embodiments, a robotic device may be controlled or directed to navigate or prioritize a working session in a first work area before navigating or operating in a second work area. In some embodiments, preferences may be set with regards to a working session such that scheduling, operational functions to be performed in the working session, and the like are preset rather than the robotic device utilizing data from prior work cycles to predict and enact a navigation and operations plan. In some embodiments, machine learning may be utilized by the robotic device, such that data from prior work sessions is utilized to predict and enact in a working session based on data collected from prior work cycles. For example, a robotic device may utilize data pertaining to, but not limited to, operational hazards encountered, type of operational hazard encountered, locations operated in, how successful a navigational route was, obstacles encountered, types of obstacles encountered, types of work surface operated on, scheduling information, preferences utilized in prior working sessions, whether multiple robotic devices were utilized, battery efficiency, and the like information. In some embodiments, a coverage plan of a robotic device may be interrupted by an individual controlling the robotic device, the individual selecting that the robotic device alter the coverage plan. For example, in embodiments, a robotic device may operate in a work area and an individual may command the robotic device to leave the area. In embodiments, if a robotic device is commanded to leave an area, one or more processors of the robotic device may compile this data for future use. In embodiments, if a robotic device is repeatedly ordered to vacate an area the one or more processors may expect that it is undesirable to conduct work operations in that work area and prioritize work operations in other areas. In some embodiments, if an individual repeatedly interrupts a coverage plan for a work area by commanding a robotic device to leave the area, the one or more processors of the robotic device may classify the portion or cells of that area as a low likelihood of successful completion of work operations.

Figure 2B:
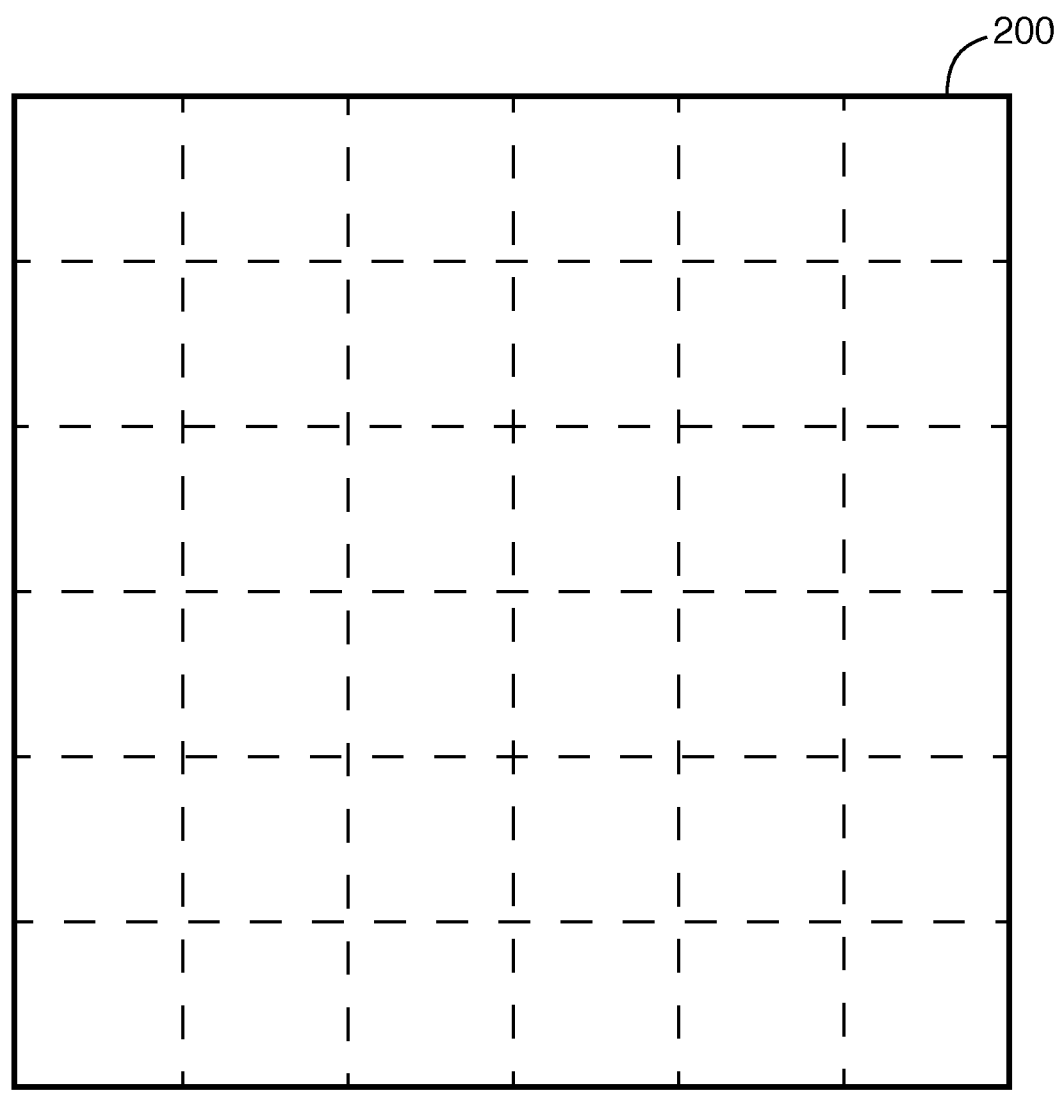
FIG. 2B illustrates an example of a grid map of a work environment.
Figure 2C:
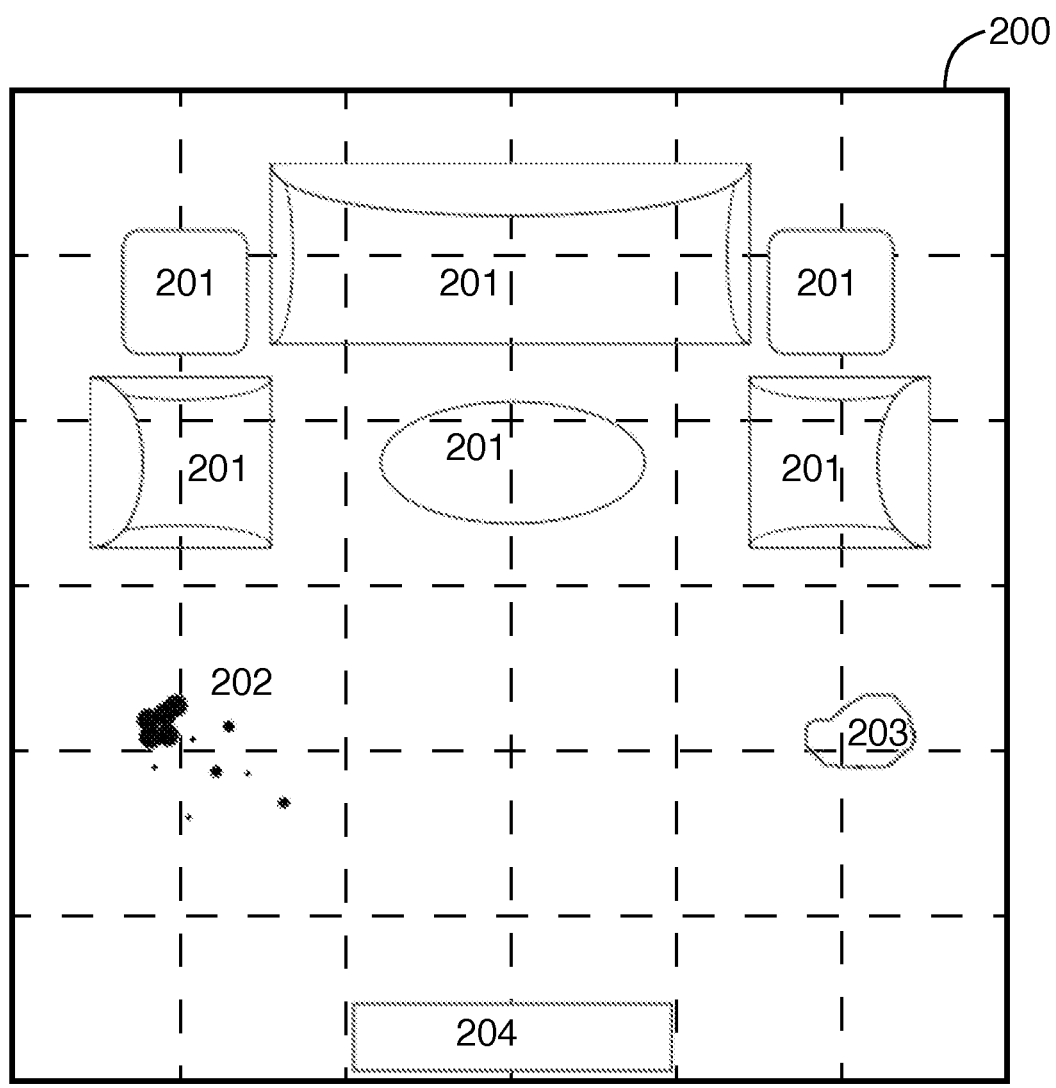
FIG. 2C illustrates an example of a grid map of a work environment with features of a work environment superimposed on the grid map.
Figure 2D:
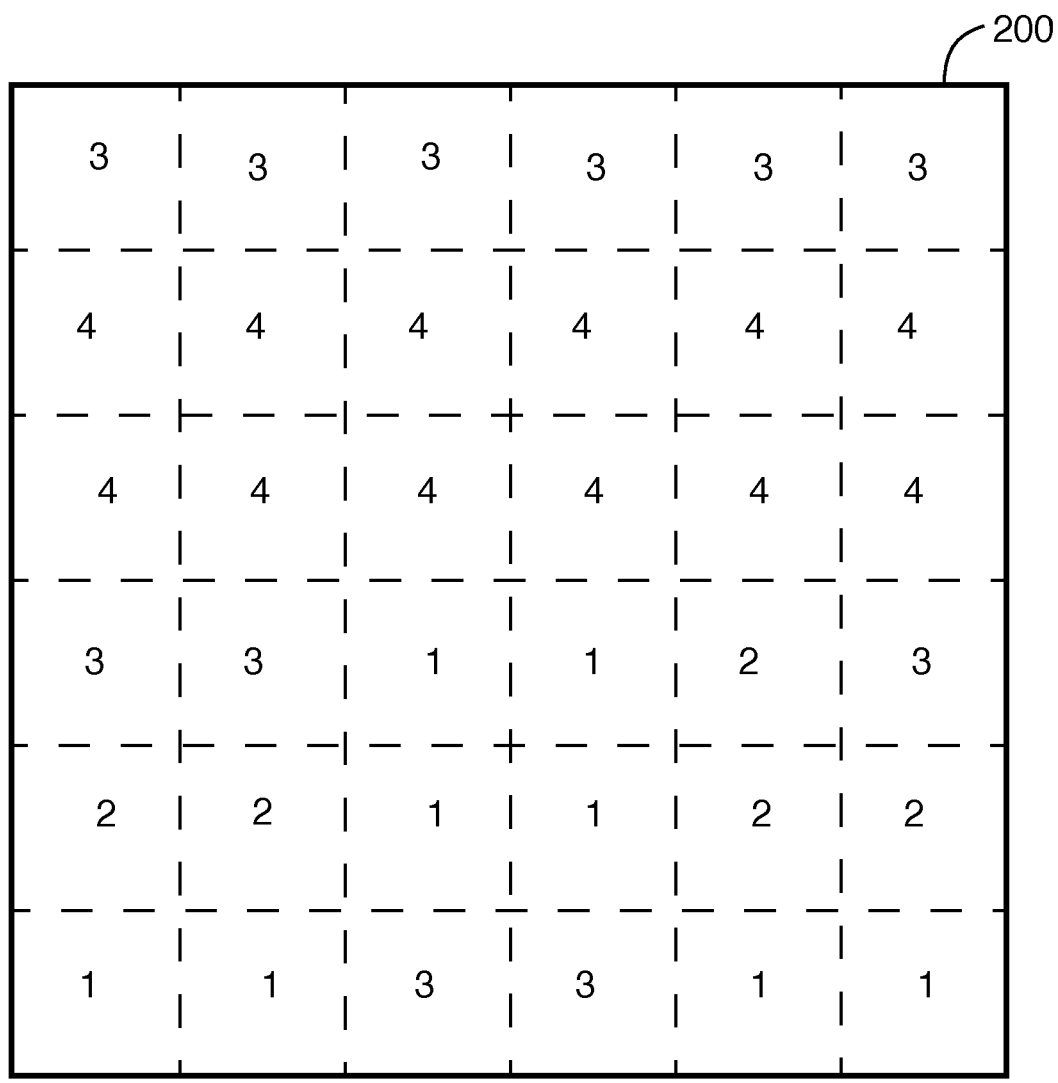
FIG. 2D illustrates an example of a grid map of a work environment with values set for each cell pertaining to likelihood of successful operations.
Figure 2E:
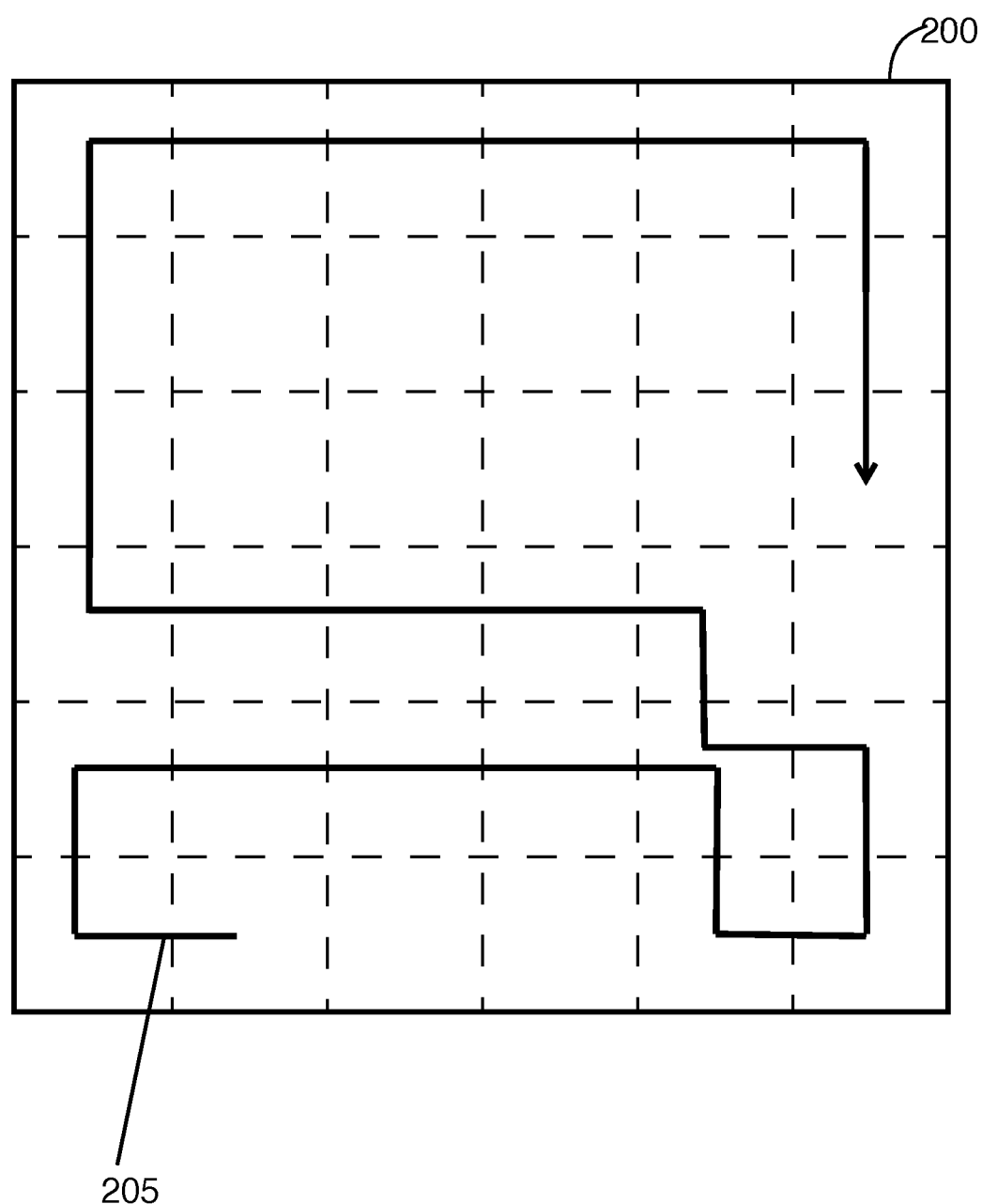
FIG. 2E illustrates an example of a coverage plan of a robotic device based on the cell values in the map.
Figure 3:
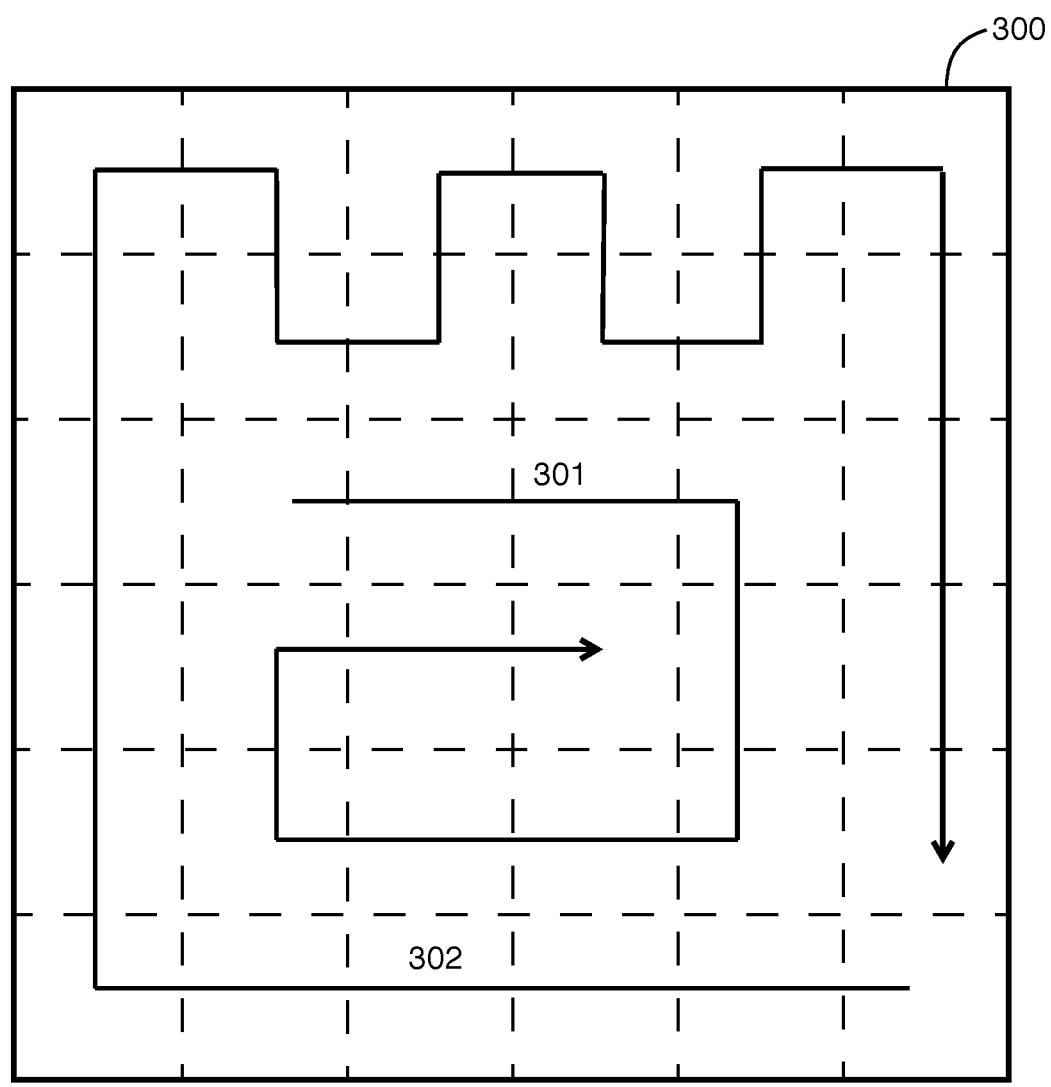
FIG. 3 illustrates an example of a first coverage plan of a robotic device and a second coverage plan of a robotic device.

FIGS. 2A-E illustrate the process by which a coverage plan is created for a robotic device based on features of a work environment. In FIG. 2A work environment 200 is illustrated in which a couch seating area set of obstacles 201 are situated, an area of obstacles 202 on work surface is located, a liquid obstacle 203 is located, and a TV media console obstacle 204 is located. In FIG. 2B a grid map of the work environment 200 is illustrated with cells. In FIG. 2C all obstacles from FIG. 2A are imposed on the grid map of the work environment 200. Specifically, in FIG. 2C a grid map of work environment 200 is displayed showing couch seating area set of obstacles 201, area of obstacles 202, liquid obstacle 203, and TV media console 204. In FIG. 2D the cells of the grid map of work environment 200 are given values based on operational hazards present in the work environment, with a low number indicated a high chance of operation success and lesser chance of containing an operational hazard while higher values represent a low likelihood of operational success and high likelihood of encountering an operational hazard. Finally, in FIG. 2E, grid map of work environment 200 is illustrated, wherein coverage plan 205 is shown for robotic device (not illustrated), wherein the coverage plan through work environment 200 is based on navigating by prioritizing operating in locations with low values first prior to operating in locations with higher values, wherein locations with the highest values are potentially avoided completely. FIG. 3 illustrates two coverage plans for a robotic device, the coverage plans for work area 300. In FIG. 3, robotic device prioritizes operating in center area of work area 300 with first coverage plan 301, before enacting second coverage plan 302 which is along a perimeter of work area 300.

In some embodiments, maps may be three dimensional maps, e.g., indicating the position of walls, furniture, doors, and the like in a room being mapped. In some embodiments, maps may be two dimensional maps, e.g., point clouds or polygons or finite ordered list indicating obstructions at a given height (or range of height, for instance from zero to 5 or 10 centimeters or less) above the floor. Two dimensional maps may be generated from two dimensional data or from three dimensional data where data at a given height above the floor is used and data pertaining to higher features are discarded. Maps may be encoded in vector graphic formats, bitmap formats, or other formats.

The robotic device may, for example, use the floor plan map to autonomously navigate the environment during operation, e.g., accessing the floor plan to determine that a candidate route is blocked by an obstacle denoted in the floor plan, to select a route with a route-finding algorithm from a current point to a target point, or the like. In some embodiments, the floor plan may be stored in memory for future use. Storage of the floor plan may be in temporary memory such that a stored floor plan is only available during an operational session or in more permanent forms of memory such that the floor plan is available at the next session or startup. In some embodiments, the floor plan is further processed to identify rooms and other segments. In some embodiments, a new floor plan is constructed at each use, or an extant floor plan is updated based on newly acquired data Some embodiments may reference previous maps during subsequent mapping operations. For example, embodiments may apply Bayesian techniques to simultaneous localization and mapping and update priors in existing maps based on mapping measurements taken in subsequent sessions. Some embodiments may reference previous maps and classifying objects in a field of view as being moveable objects or operational hazards upon detecting a difference of greater than a threshold size.

In embodiments, in a map of the work environment, a path of the robotic device may be generated, in which the robotic device will navigate. In embodiments, the path generated may be on a grid map of the work environment containing cells, in which the robotic device is controlled or directed to navigate along the path. In embodiments, the path the robotic device is to navigate along, is prioritized based on the data generated for each cell in the grid map of the work environment. In embodiments, for example, the path may prioritize navigation of the robotic device to cells in the work environment with the lowest likelihood of encountering operational hazards. In embodiments, in generating the path for the robotic device to navigate along, the processor may factor in considerations such as data pertaining to operational hazards, obstacles, work surface types, amount of debris, user preferences, and the like considerations. In embodiments, a robotic device may navigate over cells with values representing a low likelihood of operational success or higher likelihood of containing an operational hazard more slowly than cells with higher likelihood of operational success or lower likelihood of containing an operational hazard. In embodiments, a robotic device may be controlled or directed to pass over portions or cells of a map with a predetermined threshold level of values for operational success or operational hazard multiple times during a working session. In embodiments, a robotic device may be controlled or directed to operate on a portion or cell of a map for a predetermined amount of time. In embodiments, a robotic device may be programmed to operate or navigate to portions or cells of a map at a programmable frequency over a period of time. In embodiments, for example, a robotic device may be programmed to operate a working session in a work area that has a recurring level of operational hazards for a predetermined number of days in a week.

In embodiments, preferences may be set for operations or navigation of a robotic device. For example, utilizing a user interface of a communication device paired with the robotic device, such as a mobile device, laptop, tablet, smartphone, or the like, preferences may be set for the robotic device. In embodiments, for example, utilizing an application of a communication device path learning may be initiated and completed, path planning may be set, operational functions may be selected, scheduling information may be selected, and the like. In embodiments, for example, preferences may be selected for a robotic device with regards to what operational functions of a working session should be selected for a work area or cells, whether a recurring schedule should be set for a working session or operational functions for a work area or cells, what navigational path should be taken, the priority for navigation or operational functions, and the like. In embodiments, preferences may be set with regards to how many times a robotic device operates in a particular area or set of cells, and the like of a robotic device. In embodiments, preferences may set for a robotic device to operate or navigate to cells or an area of the work environment at a programmable frequency over a period of time.

In some embodiments, an application of a communications device, including but not limited to, a mobile phone, laptop, desktop computer, or the like, may be used to transmit an image captured by a camera of the communications device to a processor of the robotic device for the purpose of selecting and commanding the location for the robotic device to travel to and/or perform work functions in. The robotic device will extrapolate features of a work environment captured in an image in order to determine where the robotic device is to travel to and or perform work functions in. In embodiments, the image captured may be representative of the location of an operational hazard, type of operational hazard, number or size of operational hazards, and the like.

In some embodiments, all data are processed on the robotic device. In other embodiments, some data are processed on at least one separate device, such as a docking station of the robotic device or through another device.

In illustrations provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or."

The present techniques will be better understood with reference to the following enumerated embodiments:

1. One or more tangible, non-transitory, machine-readable media storing instructions that when executed by one or more processors of a robotic device effectuate operations comprising: obtaining, with a robotic device, raw values pertaining to operational hazards in a work environment by sensors positioned on the robotic device, generating, with one or more processors of the robotic device, a map of the work environment based on data obtained from sensors of the robotic device, generating, with one or more processors of the robotic device, a coverage plan for each section of the work area, the coverage plan prioritizing the robotic device performing work functions in work areas that have the highest probability of being successfully completed over work areas with a lesser likelihood of being successfully completed; and, the robotic device performing the coverage plan 2. The one or media of embodiment 1, wherein: the one or more processors of the robotic device generate coverage plans which prioritize operating in the center of a work area before a robotic device operates along the perimeter of the work area.

3. The one or media of any one of embodiment 1, wherein the one or more processors of the robotic device generate coverage plans which prioritize operating in portions of a work area with a low likelihood of containing operational hazards over areas with a higher likelihood of containing operational hazards.

4. The one or media of any one of embodiment 1, wherein: the robotic device detects operational hazards by any of: driving over a hazard, bumping into a hazard, becoming entangled with a hazard, detecting a hazard with a sensor positioned on the robotic device, detecting a hazard with a camera positioned on the robotic device, becoming stuck.

5. The one or media of any one of embodiment 1, wherein: the map generated of the work environment is a grid map containing cells, in which a value pertaining to likelihood of successful operations is generated for each separate cell of the map.

6. The one or media of any one of embodiment 5, wherein cells indicative of a high likelihood of successfully completing operations on a consistent basis are prioritized for coverage plans of working sessions over cells in which a low likelihood of successfully completing operations are indicated on a consistent basis.

7. The one or more media of embodiment 1, wherein the map generated of the work environment is a grid map containing cells, in which a value pertaining to likelihood of containing an operational hazard is generated for each separate cell of the map.

8. The one or more media of any one of embodiment 7, wherein: cells indicative of a low likelihood of containing operational hazards on a consistent basis are prioritized for coverage plans of working sessions over cells in which a high likelihood of containing operational hazards are indicated on a consistent basis.

9. The one or media of any one of embodiment 1, wherein: image sensors are utilized for capturing features of operational hazards encountered in the work environment and one or more processors of the robotic device infer the type of operational hazard encountered based on a catalogued internal database of operational hazards likely to be encountered by the robotic device during a working session.

10. The one or media of embodiment 1, wherein: the map of the of work environment is updated after each working session by compiling the map with all prior maps generated from prior work sessions into an aggregate map of the work environment, the aggregate map reflecting the values for operational success and/or operational hazards for each portion of the map.

11. The one or media of embodiment 1, wherein: the one or more processors of the robotic device compile all data collected by the robotic device after the robotic device has completed each work session, the data pertaining to any of: operational success, operational failure, operational hazard encountered, operational hazard type, number of operational hazards, location of an operational hazard, lack of operational hazard, scheduling, mapping, localization, work functions, tasks performed, work surface type, obstacles encountered, obstacle type, obstacle location, battery efficiency, operational efficiency, navigation efficiency, length of time to complete a working session, length of time to operate in each area, whether operations were successfully completed, navigational route taken, user preferences set, and date and time for a working session.

12. The one or media of embodiment 1, wherein: determining at least part of the coverage plan comprises segmenting the working environment into a priority area and a marginal area; and the coverage plan specifies that the priority area is visited by the robotic device before the marginal area.

13. A method, the method comprising any one of embodiments 1-12.

I claim:

1. One or more tangible, non-transitory, machine-readable media storing instructions that when executed by one or more processors of a robotic device effectuate operations comprising:

obtaining, with a robotic device, raw values pertaining to operational hazards in a work environment by sensors positioned on the robotic device;

generating, with one or more processors of the robotic device, a map of the work environment based on data obtained from sensors of the robotic device, wherein the map generated of the work environment is a grid map including cells, in which a value pertaining to likelihood of successfully completing operations is generated for each separate cell of the map;

generating, with one or more processors of the robotic device, a coverage plan for each section of the work area, the coverage plan prioritizing the robotic device performing work functions in work areas that have a highest probability of being successfully completed over work areas with a lesser likelihood of being successfully completed; and, the robotic device performing the coverage plan.

2. The one or more media of claim 1, wherein:
the one or more processors of the robotic device generate coverage plans which prioritize operating in a center of a work area before a robotic device operates along a perimeter of the work area.

3. The one or more media of claim 1, wherein:
the one or more processors of the robotic device generate coverage plans which prioritize operating in portions of a work area with a low likelihood of including operational hazards over areas with a higher likelihood of including operational hazards.

4. The one or more media of claim 1, wherein the robotic device detects operational hazards by any of: driving over a hazard, bumping into a hazard, becoming entangled with a hazard, detecting a hazard with a sensor positioned on the robotic device, detecting a hazard with a camera positioned on the robotic device, and becoming stuck.

5. The one or more media of claim 1, wherein cells indicative of a high likelihood of successfully completing operations on a consistent basis are prioritized for coverage plans of working sessions over cells in which a low likelihood of successfully completing operations are indicated on a consistent basis.

6. The one or media of claim 1, wherein the value generated for each separate cell of the map further pertains to a likelihood of including an operational hazard.

7. The one or more media of claim 6, wherein cells indicative of a low likelihood of including operational hazards on a consistent basis are prioritized for coverage plans of working sessions over cells in which a high likelihood of including operational hazards are indicated on a consistent basis.

8. The one or more media of claim 1, wherein:
image sensors are utilized for capturing features of operational hazards encountered in the work environment and one or more processors of the robotic device infer a type of operational hazard encountered based on a catalogued internal database of operational hazards likely to be encountered by the robotic device during a working session.

9. The one or more media of claim 1, wherein:
the map of the of work environment is updated after each working session by compiling the map with all prior maps generated from prior work sessions into an aggregate map of the work environment, the aggregate map reflecting the values for any of operational success and operational hazards for each portion of the map.

10. The one or more media of claim 1, wherein:
the one or more processors of the robotic device compile all data collected by the robotic device after the robotic device has completed each work session, the data pertaining to any of: operational success, operational failure, operational hazard encountered, operational hazard type, number of operational hazards, location of an operational hazard, lack of operational hazard, scheduling, mapping, localization, work functions, tasks performed, work surface type, obstacles encountered, obstacle type, obstacle location, battery efficiency, operational efficiency, navigation efficiency, length of time to complete a working session, length of time to operate in each area, whether operations were successfully completed, navigational route taken, user preferences set, and date and time for a working session.

11. The one or more media of claim 1, wherein:
determining at least part of the coverage plan comprises segmenting the working environment into a priority area and a marginal area; and the coverage plan specifies that the priority area is visited by the robotic device before the marginal area.

12. A method, comprising:
generating, with one or more processors of a robotic device, a map of the work environment based on data obtained from sensors of the robotic device, wherein the map generated of the work environment is a grid map including cells, in which a first value pertaining to likelihood of successfully completing operations is generated for each separate cell of the map;
the robotic device operating in a first portion of a work area while traversing the first portion of the work area in a first pattern, wherein:
at least part of the first pattern is determined by the one or more processors of the robotic device based on an aggregate map generated from prior work sessions wherein an objective function is used to assign values to portions of the aggregate map comprising at least one of the following: likelihood of operational success, likelihood of operational failure, and likelihood of encountering an operational hazard; and
the robotic device operating in a second portion of the work area while traversing the second portion of the work area in a second pattern.

13. The method of claim 12, wherein:
the first portion of the work area that a robotic device operates in comprises a center of the work area and the second portion of the work area the robotic device operates in comprises a perimeter of the work area.

14. The method of claim 12, wherein the robotic device detects operational hazards by any of: driving over a hazard, bumping into a hazard, becoming entangled with a hazard, detecting a hazard with a sensor positioned on the robotic device, detecting a hazard with a camera positioned on the robotic device, and becoming stuck.

15. The method of claim 12, wherein:
the robotic device generates a new map of the work environment during each work session and the first value generated for each separate cell of the map further pertains to a likelihood of including an operational hazard.

16. The method of claim 15, wherein areas of the map indicative of a high likelihood of including an operational hazard are given a lower priority for a coverage plan than areas indicative of having a lesser likelihood of including an operational hazard.

17. The method of claim 15, wherein cells indicative of a high probability of successfully completing work operations are given priority for a coverage plan over areas indicative of having a low probability of successfully completing work operations.

18. The method of claim 15, wherein when the robotic device has completed a work session, the new map generated during that work session is compiled with all maps generated from prior work sessions into the aggregate map of the work environment.

19. The method of claim 12, wherein image sensors of the robotic device are utilized for capturing features of operational hazards encountered in the work environment and one or more processors of the robotic device infer a type of operational hazard encountered based on a catalogued internal database of operational hazards likely to be encountered by the robotic device during a working session.

20. The method of claim 12, wherein:
the one or more processors of the robotic device compile all data collected by the robotic device after the robotic device has completed each work session, the data pertaining to any of: operational success, operational failure, operational hazard encountered, operational hazard type, number of operational hazards, location of an operational hazard, lack of operational hazard, scheduling, mapping, localization, work functions, tasks performed, work surface type, obstacles encountered, obstacle type, obstacle location, battery efficiency, operational efficiency, navigation efficiency, length of time to complete a working session, length of time to operate in each area, whether operations were successfully completed, navigational route taken, user preferences set, and date and time for a working session.

* * * * *